United States Patent [19]

Connell et al.

[11] Patent Number: 5,554,715
[45] Date of Patent: Sep. 10, 1996

[54] POLY(N-ARYLENEBENZIMIDAZOLE)S VIA AROMATIC NUCLEOPHILIC DISPLACEMENT

[75] Inventors: John W. Connell; Paul M. Hergenrother; Joseph G. Smith, Jr., all of Yorktown, Va.

[73] Assignee: The United States of America as represented by the Administrator of National Aeronautics and Space Administration, Washington, D.C.

[21] Appl. No.: 375,334

[22] Filed: Jan. 17, 1995

Related U.S. Application Data

[62] Division of Ser. No. 45,339, Mar. 5, 1993, Pat. No. 5,410,012.

[51] Int. Cl.$^6$ .................................................... C08G 73/18
[52] U.S. Cl. .......................... 528/125; 528/128; 528/171; 528/172; 528/174; 528/183; 528/185; 528/186; 528/208; 528/210; 528/215; 528/219; 528/220; 528/228
[58] Field of Search ...................... 528/125, 128, 528/171, 172, 174, 183, 185, 186, 191, 208, 210, 215, 220, 228

[56] References Cited

U.S. PATENT DOCUMENTS

| | | | |
|---|---|---|---|
| Re. 26,065 | 7/1966 | Marvel | 528/183 |
| 2,895,948 | 7/1959 | Brinker | 528/183 |
| 3,708,439 | 1/1973 | Sayigh et al. | 528/183 |
| 5,317,078 | 5/1994 | Connell et al. | 528/210 |
| 5,410,012 | 4/1995 | Connell et al. | 528/125 |
| 5,412,059 | 5/1995 | Connell et al. | 528/125 |

*Primary Examiner*—Jeffrey Mullis
*Assistant Examiner*—P. Hampton-Hightower
*Attorney, Agent, or Firm*—George F. Helfrich

[57] ABSTRACT

Novel poly(N-arylenebenzimidazole)s (PNABIs) are prepared by the aromatic nucleophilic displacement reaction of novel di(hydroxyphenyl-N-arylene benzimidazole) monomers with activated aromatic dihalides or activated aromatic dinitro compounds. The polymerizations are carried out in polar aprotic solvents such as N-methyl-2-pyrrolidinone or N,N-dimethylacetamide using alkali metal bases such as potassium carbonate at elevated temperatures under nitrogen. The di(hydroxyphenyl-N-arylenebenzimidazole) monomers are synthesized by reacting phenyl-4-hydroxybenzoate with bis(2-aminoanilino)arylenes in diphenylsulfone. Moderate molecular weight PNABIs of new chemical structures were prepared that exhibit a favorable combination of physical and mechanical properties. The use of the novel di(hydroxyphenyl-N-arylenebenzimidazole)s permits a more economical and easier way to prepare PNABIs than previous routes.

3 Claims, 2 Drawing Sheets

POLY(N-ARYLENEBENZIMIDAZOLE)S VIA AROMATIC NUCLEOPHILIC DISPLACEMENT

ORIGIN OF THE INVENTION

The invention described herein was jointly made by employees of the United States Government and a contract employee in the performance of work under NASA Grant No. NAG-1-448 and is subject to the provisions of Public Law 96-517 (35 USC 202) in which the contractor has elected not to retain title.

This is a divisional of application Ser. No. 08/045,339 filed on Mar. 5, 1993, now U. S. Pat. No. 5,410,012.

CROSS-REFERENCE TO RELATED APPLICATIONS

This application is related to patent application Ser. No. 08/045,335, filed Apr. 5, 1993, entitled "Polybenzimidazoles Via Aromatic Nucleophilic Displacement" now U.S. Pat. No. 5,412,059 and patent application Ser. No. 07/790,730, filed Oct. 30, 1991, entitled "Polybenzimidazoles Via Aromatic Nucleophilic Displacement" now U.S. Pat. No. 5,317,078.

BACKGROUND OF THE INVENTION

1. Field of the Invention

This invention relates generally to heterocyclic polymers. In particular it relates to polybenzimidazoles where chain extension occurs through an arylene substituent on the substituted nitrogen of the benzimidazole ring.

2. Description of the Related Art

Polybenzimidazoles (PBI) are heterocyclic polymers commonly prepared by the condensation reaction of an aromatic bis(o-diamine) with an aromatic diacid or derivative thereof and having a repeat unit of the general structure where Ar is a tetravalent aromatic radical such as 1,2,4,5-tetrasubstituted benzene. Ar may also be a bis(o-diphenylene) having the general structure where Z=nil, O, S, $SO_2$, C=O, $CH_2$, or any other appropriate divalent radical. Ar' is a divalent aromatic radical which may be 1,3-phenylene, 1,4-phenylene, 4,4'-biphenylene, 4,4'-oxydiphenylene, 4,4'-sulfonyldiphenylene, or any other appropriate divalent radical.

The synthesis and characterization of PBI has been extensively studied and documented. Reviews on PBI are available. (A. Buckley, D. E. Stuez, and G. A. Serad, Encyl. Poly. Sci. Tech., Vol. 11., 2nd ed., 1988, p. 572; P. E. Cassidy, "Thermally Stable Polymers", Marcel Dekker, Inc., New York, 1980, p. 163.) The first reported synthesis of PBI involved the reaction of aliphatic dicarboxylic acids with aromatic bis(o-diamine)s [K. C. Brinker and I. M. Robinson, U.S. Pat. No. 2,895,948 (Jul. 21, 1959)]. Since then several methods have been utilized in their preparation. Each method will be briefly mentioned with an accompanying reference. The most common synthetic method of PBI involves the melt condensation of aromatic bis(o-diamine(s)) with aromatic diacids or derivatives thereof [H. Vogel and C. S. Marvel, J. Polym. Sci., 50, 511 (1961)]. PBI has also been prepared in polyphosphoric acid [Y. Iwakura, K. Uno, and Y. Imai, J. Polym. Sci., Part A, 2, 2605 (1964)] and in sulfane or diphenylsulfone [F. L. Hedberg and C.S. Marvel, J. Polym. Sci., Poly. Chem., 12, 1823 (1974)]from aromatic bis(o-diamine)s and aromatic diacids or derivatives thereof.

Another preparative route involves the reaction of aromatic bis(o-diamine)s with the bis(bisulfite adduct)s of dihaldehydes [J. Higgins and C. S. Marvel, J. Polym. Sci., Part A-1, 8, 171 (1970)]. The alkoxide catalyzed reaction of aromatic bis(o-diamine)s with dinitriles is another synthetic route [D. I. Packham, J. D. Davies, and H. M. Paisley, Polymer, 10, (12), 923 (1969)].

PBIs where the hydrogen atom on the nitrogen atoms of the benzimidazole ring are replaced by phenyl groups have been prepared from the reaction of bis(o-anilinoamino) arylenes with aromatic dicarboxylic acids or derivatives thereof. [H. Vogel and C. S. Marvel, J. Polym. Sci., A1, 1531 (1963)]. The resultant polymers exhibited slightly better thermal oxidative stability than unsubstituted PBIs; however, they were too thermoplastic to be useful.

PBIs where chain extension occurs through the arylene substituent on the substituted nitrogen of the benzimidazole ring are a variation of the phenyl substituted PBIs called poly(N-arylenebenzimidazole)s (PNABIs). They were prepared in high molecular weight from the melt reaction of the diphenyl esters of aromatic dicarboxylic acids with bis(o-aminoanilino) arylenes. [A. A. R. Sayigh, B. W. Tucker, and H. Ulrich (Upjohn Co.), U.S. Pat. No. 3,708,439, Jan. 2, 1973)].

SUMMARY OF THE INVENTION

A primary object of the present invention is to provide a novel composition of matter and a new process for the preparation of poly(N-arylenebenzimidazole)s (PNABIs).

Another object of the present invention is to provide new PNABIs that are useful as adhesives, coatings, films, membranes, moldings, and composite matrices.

Another object of the present invention to provide several new di(hydroxyphenyl-N-arylenebenzimidazole) monomers.

Figure 1:
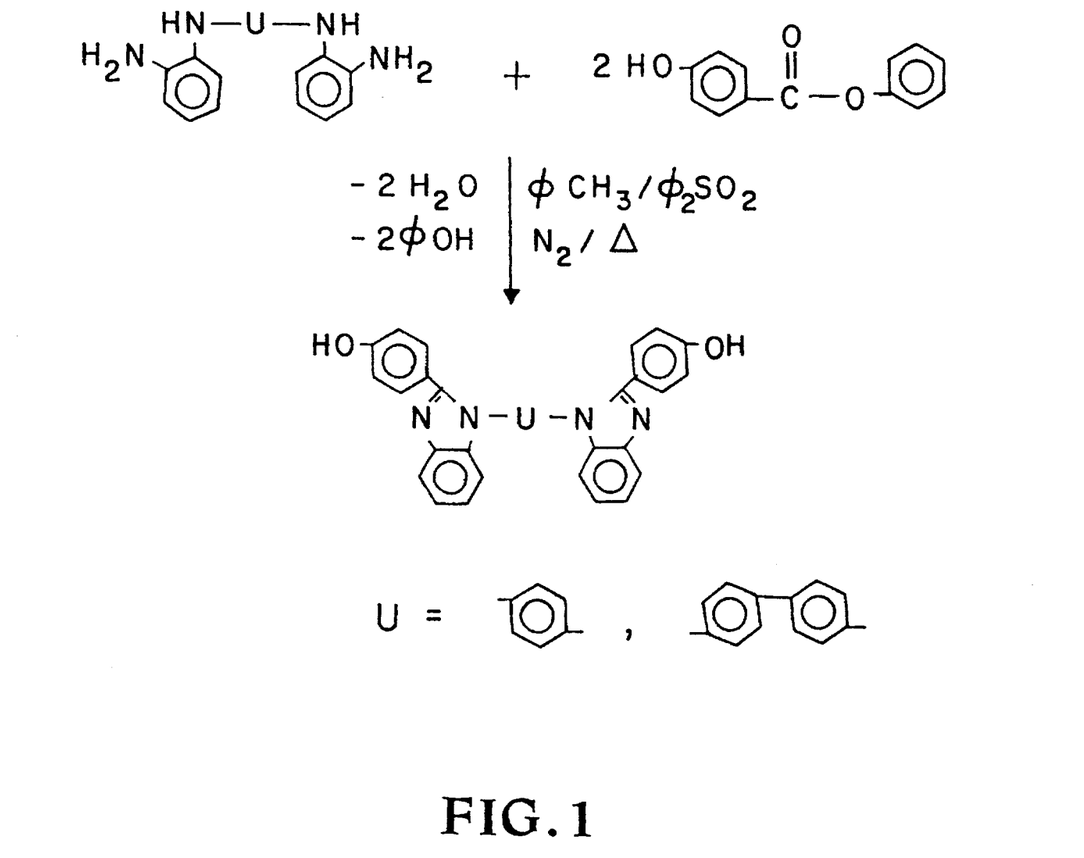
FIG. 1 is an equation representing the reaction sequence for the preparation of monomers according to the present invention.

According to the present invention the foregoing and additional objects obtained by synthesizing PNABI by the nucleophilic displacement reaction of di(hydroxypyhenyl-N-arylenebenzimidazole)monomers with activated aromatic dihalides. The N-arylenebenzimidazole monomers were prepared from phenyl-4-hydroxybenzoate and bis(2-aminoanilino)arylenes as shown in the equation of FIG. 1. The inherent viscosities ($\eta_{inh}$) of the PNABI ranged from 0.37 to 0.86 dL/g and the glass transition temperatures ($T_g$) ranged from 219°–289° C. Thermogravimetric analysis (TGA) at a heating rate of 2.5° C./min showed no weight loss occurring below 300° C. in air or nitrogen with a 5% weight loss occurring at about 475° C. in air and at about 500° C. in nitrogen. The average tensile strength, tensile modulus, and break elongation at 23° C. for unoriented thin films were 11.6 ksi, 305 ksi, and 5%, respectively.

BRIEF DESCRIPTION OF THE DRAWINGS

For a more complete understanding of the present invention, including its objects and attending benefits, reference should be made to the Description of the Preferred Embodiments, which is set forth below. This Description should be read together with the accompanying drawings, wherein.

DESCRIPTION OF THE PREFERRED EMBODIMENTS

In one aspect, the present invention is a poly(N-arylenebenzimidazole) consisting of repeat units having the general structural formula wherein the catenation of oxygen is selected from the group consisting of meta-meta, para-para, and para-meta. Ar is a radical having the formula wherein U is a radical selected from the group of wherein R is a bond or is a radical selected from the group of $CH_2$, CO, S, O, $SO_2$, wherein X is a radical selected from the group consisting of:

$-\overset{O}{\underset{\|}{C}}-$, $-SO_2-$, and n is an integer between 4 and 1000.

An especially preferred poly(N-arylenebenzimidazole) is provided when Ar is a radical represented by either:

(A)

X being selected from the group consisting of:

$-\overset{O}{\underset{\|}{C}}-$  $-SO_2-$

; or (B)

X being selected from the group consisting of:

In another aspect, the present invention is a di(hydroxyphenyl-N-arylenebenzimidazole) having the general structure wherein the catenation of the hydroxy radicals is selected from the group consisting of meta-meta, para-para, and para-meta. U is selected from the group consisting of and R is a bond or is a radical selected from the group of $CH_2, CO, S, O, SO_2,$

Especially preferred di(hydroxyphenyl-N-arylenebenzimidazole)s are and

In another aspect, the present invention is a process for synthesizing poly(N-arylenebenzimidazole)s by aromatic nucleophilic displacement. The process includes reacting a di(hydroxyphenyl-N-arylenebenzimidazole) with an activated aromatic dihalide or aromatic dinitro compound have the general structure wherein X is a radical selected from the group consisting of

Y is a member selected from the group consisting of Cl, F, and NO₂. The reaction is carried out in a polar aprotic solvent selected from the group consisting of N,N-dimethylacetamide, N-methyl-2-pyrrolidinone, sulfolane, diphenylsulfone, N-cyclohexyl-2-pyrrolidinone, and dimethylsulfoxide. The reaction is carried out in the presence of an alkali metal base, selected from the group consisting of potassium carbonate, sodium carbonate, potassium hydroxide, and sodium hydroxide, and the reaction is carried out with the application of heat.

Especially good results are obtained when X is selected from the group consisting of and when Ar is either and Y is either Cl or F, preferably F, and the solvent is sulfolane.

Films prepared from the poly(N-arylenebenzimidazole)s of the present invention have very desirable properties.

Having generally described the invention, a more complete understanding thereof can be obtained by reference to the following examples which are provided herein for purposes of illustration only and do not limit the invention.

EXAMPLE 1

Monomer Synthesis

The following example illustrates the reaction sequence in FIG. 1 for the preparation of monomers.

1,1'-(1,4-Phenylene)-bis[2-(4-hydroxyphenyl)benzimidazole]

A mixture of 1,4-bis(2-aminoanilino)benzene (28.73 g, 0.099 mol), phenyl-4-hydroxybenzoate (42.96 g, 0.201 mol), diphenylsulfone (126.45 g), and toluene (100 ml) was heated under a nitrogen atmosphere for three hours at 150° C. The toluene was removed and the temperature increased to 290° C. and maintained for two hours. A vacuum was subsequently applied and maintained for one hour. The cooled purple reaction mixture was poured into warm toluene, and the solid recovered by filtration. The crude solid was washed in hot toluene and subsequently dried at 110° C. to afford a purple powder (44.2 g, 90% crude yield), mp [Differential Scanning Calorimetry (DSC), heating rate of 10° C./min] sharp peak at 403° C. The solid was recrystallized twice from N,N-dimethylacetamide (DMAc) using charcoal to afford a white powder (26.95 g, 55% yield). The compound exhibited a sharp melt by DSC (heating rate of 10° C./min) with a peak at 407° C. Anal. calcd. for $C_{32}H_{22}N_4O_2$: C, 77.72%; H, 4.48%; N, 11.33%; Found: C, 77.48%; H, 4.41%; N, 11.39%.

1,1'-(3,3'-Biphenylene):bis[2-(4-bydroxyphenyyl)benzimidazole]

A mixture of 4,4'-bis(2-aminoanilino)biphenyl (20.0 g, 0.055 mol), phenyl-4-hydroxybenzoate (24.31 g, 0.114 mol), diphenylsulfone (125.29 g)., and toluene (135 ml) was heated under a nitrogen atmosphere for three hours at 150° C. The toluene was removed and the temperature increased to 290° C. and maintained for two hours. A vacuum was subsequently applied and maintained for three-quarters hour. The gray reaction mixture was washed successively in hot toluene and acetone and subsequently dried at 110° C. to afford a gray powder (27.06 g, 87% crude yield), mp (DSC)

broad peak at 483° C. The solid was recrystallized from DMAc using charcoal to afford a light pink powder (24.24 g, 78% yield). The compound exhibited a broad melt by DSC with a peak at 487° C. Anal. calcd. for $C_{38}H_{26}N_4O_2$: C, 79.98%; H, 4.59%; N, 9.82%; Found: C, 80.41%; H, 4.76%; N, 10.01%.

EXAMPLE 2

Poly(N-arylenebenzimidazole) Synthesis

Figure 2:
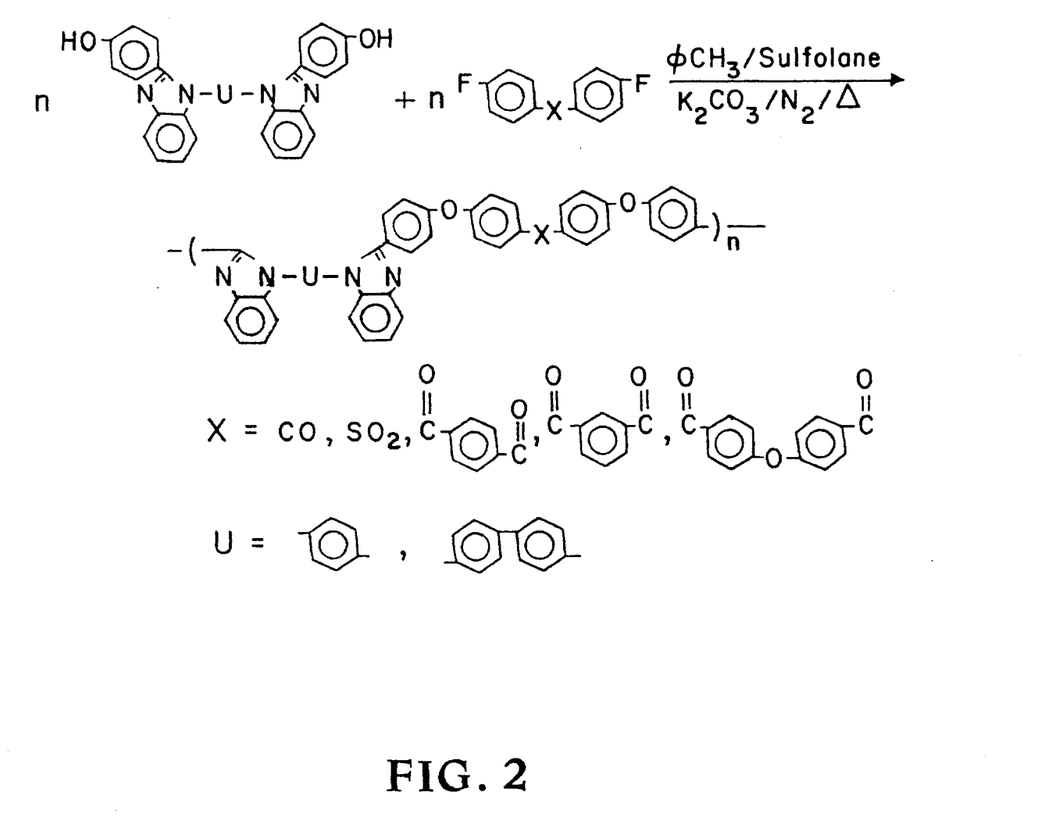
FIG. 2 is an equation representing the reaction sequence for the preparation of polymers according to the present invention.

The following example illustrates the reaction sequence in FIG. 2 for the preparation of the polymer where X is equal to a sulfonyl group, Y is F, U is 1,4-phenylene, and the catenation of the hydroxy groups is para-para.

Into a 100 ml three necked round bottom flask equipped with nitrogen inlet, thermometer, mechanical stirrer, and Dean Stark trap was placed 1,1'-(1,4-phenylene)-bis[2-(4-hydroxyphenyl)benzimidazole](2.3866 g, 4.8 mmol), 4,4'-difluorodiphenylsulfone (1.2270 g, 4.8 mmol) pulverized anhydrous potassium carbonate (1.8176 g, 13.2 mmol), sulfolane (15.8 g, 19% solids w/w) and toluene (50 ml). The mixture was heated to 140°–150° C. for three and one-half hours and then heated to 210° C. for three hours. The viscous solution was precipitated in a water/acetic acid (10/1) mixture, washed successively in hot water and methanol and dried at 110° C. to provide an off-white polymer (3.30 g, 97% yield) with a $T_g$ of 270° C. The inherent viscosity of a 0.5% solution in m-cresol at 25° C. was 0.77 dL/g.

EXAMPLE 3

The following example illustrates the reaction sequence in FIG. 2 for the preparation of the polymer where X is equal to an isophthaloyl group, Y is F, U is 1,4-phenylene, and the catenation of the hydroxy groups is para-para.

Into a 100 ml three necked round bottom flask equipped with nitrogen inlet, thermometer, mechanical stirrer, and Dean Stark trap was placed 1,1'-(1,4-phenylene)-bis[2-(4-hydroxyphenyl)benzimidazole](2.4006 g, 4.9 mmol), 1,3-bis(4-fluorobenzoyl)benzene (1.5645 g, 4.9 mmol) pulverized anhydrous potassium carbonate (1.8658 g, 13.5 mmol), sulfolane (17.25 g, 19% solids w/w) and toluene (50 ml). The mixture was heated to 140°–150° C. for three and one-half hours and then heated to 210° C. for three hours. The viscous reaction mixture was cooled and diluted with 10 ml NMP (12.6% solids w/w). The viscous solution was precipitated in a water/acetic acid (10/1) mixture, washed successively in hot water and methanol and dried at 110° C. to provide an off-white polymer (3.74 g, 99% yield) -with a $T_g$ of 219° C. The inherent viscosity of a 0.5% solution in NMP at 25° C. was 0.75 dL/g. Unoriented thin films cast from a NMP solution gave tensile strength, tensile modulus, and elongation at 23° C. of 10.2 ksi, 362 ksi, and 4%, respectively.

EXAMPLE 4

The following example illustrates the reaction sequence in FIG. 2 for the preparation of the polymer where X is equal to a sulfonyl group, Y is F, U is 4,4'-biphenylene, and the catenation of the hydroxy groups is para-para.

Into a 100 ml three necked round bottom flask equipped with nitrogen inlet, thermometer, mechanical stirrer, and Dean Stark trap was placed 1,1-(4,4'-biphenylene)-bis[2-(4-hydroxyphenyl)benzimidazole](3.0103 g, 5.3 mmol), 4,4'-difluorodiphenylsulfone (1.3412 g, 5.3 mmol), pulverized anhydrous potassium carbonate (2.1068 g, 15.2 mmol), sulfolane (19.61 g, 18% solids w/w) and toluene (45 ml). The mixture was heated to 140°–150° C. for three and one-half hours and then heated to 200° C. for three hours. The viscous reaction mixture was precipitated in a water/acetic acid (10/1) mixture, washed successively in hot water and methanol and dried at 110° C. to provide an off-white polymer (4.00 g, 97% yield) with a $T_g$ of 289° C. The inherent viscosity of a 0.5% solution in NMP at 25° C. was 0.60 dL/g. Unoriented thin films cast from a NMP solution gave tensile strength, tensile modulus, and elongation at 23° C. of 12.1 ksi, 365 ksi, and 4%, respectively,

EXAMPLE 5

The following example illustrates the reaction sequence in FIG. 2 for the preparation of the polymer where X is equal to an isophthaloyl group, Y is F, U is 4,4'-biphenyl, and the catenation of the hydroxy groups is para-para.

Into a 100 ml three necked round bottom flask equipped with nitrogen inlet, thermometer, mechanical stirrer, and Dean Stark trap was placed 1,1'-(4,4'-biphenyl)-bis[2-(4-hydroxyphenyl)benzimidazole] (2.0340 g, 3.6 mmol), 1,3-bis(4-fluorobenzoyl)benzene (1.1488 g, 3.6 mmol), pulverized anhydrous potassium carbonate (1.3098 g, 9.5 mmol), sulfolane (14.58 g, 18% solids w/w) and toluene (50 ml). The mixture was heated to 140°–150° C. for three and one-half hours and then heated to 210° C. After one and one-quarter hours the viscous reaction mixture was diluted with 14.14 g sulfolane (10% solids w/w) and stirring continued at 210° C. for an additional one hour. The viscous reaction mixture was cooled and precipitated in a water/acetic acid (10/1) mixture, washed successively in hot water and methanol and dried at 110° C. to provide an off-white polymer (2.97 g, 98% yield) with a $T_g$ of 244° C. The inherent viscosity of a 0.5% solution in NMP at 25° C. was 0.59 dL/g. Unoriented thin films cast from a NMP solution gave tensile strength, tensile modulus, and elongation at 23° C. of 12.1 ksi, 341 ksi, and 5%, respectively.

Polymer characterization is presented in the following Table 1 and unoriented thin film properties are presented in Table 2.

TABLE 1
POLYMER CHARACTERIZATION

| X | U | $\eta_{inh}$, dL/g[1] | Tg, °C[3] | Temperature of 5% WEIGHT LOSS, °C[4] air | Temperature of 5% WEIGHT LOSS, °C[4] N₂ |
|---|---|---|---|---|---|
| SO₂ |  | 0.60 | 289 | 465 | 493 |
|  |  | 0.77[2] | 270 | 469 | 467 |
| CO |  | 0.37 | 268 | 463 | 484 |
|  |  | 0.48[2] | 242 | 489 | 522 |
|  |  | 0.62 | 259 | 472 | 510 |
|  |  | 0.86[2] | 238 | 487 | 513 |
|  |  | 0.59 | 244 | 468 | 515 |
|  |  | 0.75 | 219 | 506 | 512 |
|  |  | 0.63 | 243 | 490 | 502 |
|  |  | 0.46 | 223 | 522 | 514 |

TABLE 1-continued

POLYMER CHARACTERIZATION

| X | U | $\eta_{inh}$, dL/g[1] | Tg, °C.[3] | Temperature of 5% WEIGHT LOSS,°C.[4] | |
|---|---|---|---|---|---|
| | | | | air | $N_2$ |

[1]Inherent viscosity obtained on 0.5% N-methyl-2-pyrrolidinone solutions at 25° C.
[2]Inherent viscosity obtained on 0.5% m-cresol solutions at 25° C.
[3]Determined by differential scanning calorimetry at a heating rate of 20° C./min.
[4]Determined by thermogravimetric analysis at a heating rate of 2.5° C./min.

TABLE 2

UNORIENTED THIN FILM TENSILE PROPERTIES (23° C.)

| X | U | $\eta_{inh}$ dL/g[1] | STR. ksi | MOD. ksi | ELONG., % |
|---|---|---|---|---|---|
| $SO_2$ | biphenyl | 0.60 | 12.1 | 365 | 4 |
| $\overset{O}{\underset{\|\|}{C}}\!\!-\!\!\bigcirc\!\!-\!\!\overset{O}{\underset{\|\|}{C}}$ (para) | biphenyl | 0.62 | 12.3 | 353 | 5 |
| | phenyl | 0.86[2] | 11.0 | 350 | 5 |
| $\overset{O}{\underset{\|\|}{C}}\!\!-\!\!\bigcirc\!\!-\!\!\overset{O}{\underset{\|\|}{C}}$ (meta) | biphenyl | 0.59 | 12.1 | 341 | 5 |
| | phenyl | 0.75 | 10.2 | 362 | 4 |

TABLE 2-continued

UNORIENTED THIN FILM TENSILE PROPERTIES (23° C.)

| X | U | $\eta_{inh}$ dLg[1] | STR. ksi | MOD. ksi | ELONG., % |
|---|---|---|---|---|---|
| ![X structure with C=O and O linkages] | ![biphenyl] | 0.63 | 12.5 | 318 | 7 |
|  | ![phenyl] | 0.46 | 11.2 | 345 | 5 |

[1] Inherent viscosity obtained on 0.5% N-methyl-2-pyrrolidinone solutions at 25° C.
[2] Inherent viscosity obtained on 0.5% m-cresof solutions at 25° C.

We claim:

1. A di(hydroxyphenyl-N-arylenebenzimidazole) having the general structure wherein the catenation of the hydroxy radicals is selected from the group consisting of meta-meta, para-para, and para meta; wherein U is selected from the group consisting of and and R is a bond or is a radical selected from the group of

CH, CO, S, O, SO$_2$ or

![fluorene structure]

2. A di(hydroxyphenyl-N-arylenebenzimidazole) of claim 1, having the formula

3. A di(hydroxyphenyl-N-arylenebenzimidazole) of claim 1, having the formula

* * * * *